United States Patent
Gao et al.

(10) Patent No.: US 11,740,076 B2
(45) Date of Patent: Aug. 29, 2023

(54) LARGE-DEPTH-RANGE THREE-DIMENSIONAL (3D) MEASUREMENT METHOD, SYSTEM, AND DEVICE BASED ON PHASE FUSION

(71) Applicant: Guangdong University of Technology, Guangzhou (CN)

(72) Inventors: Jian Gao, Guangzhou (CN); Zhuojun Zheng, Guangzhou (CN); Lanyu Zhang, Guangzhou (CN); Haixiang Deng, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 17/986,026

(22) Filed: Nov. 14, 2022

(65) Prior Publication Data
US 2023/0074445 A1    Mar. 9, 2023

(30) Foreign Application Priority Data
Apr. 20, 2022   (CN) .......................... 202210413263.X

(51) Int. Cl.
G01B 11/25         (2006.01)
(52) U.S. Cl.
CPC ........ *G01B 11/2527* (2013.01); *G01B 11/254* (2013.01)
(58) Field of Classification Search
CPC .............. G01B 11/2527; G01B 11/254; G01B 9/02007; G01B 9/02002
See application file for complete search history.

(56) References Cited

U.S. PATENT DOCUMENTS 10,914,575 B1 *   2/2021   Gao .................... G01B 11/2527
2011/0080471 A1 *   4/2011   Song ........................ G06T 7/521
356/627
(Continued)

FOREIGN PATENT DOCUMENTS

CN       107063128 A       8/2017
CN       107356212 A       11/2017
(Continued)

OTHER PUBLICATIONS

Chao Zuo et al., Phase shifting algorithms for fringe projection profilometry: A review, May 15, 2018, Elsevier, Optics and Lasers in Engineering, 109 (2018) 23-59 (Year: 2018).*
(Continued)

*Primary Examiner* — Michael P LaPage

(57) ABSTRACT

This disclosure relates to optical three-dimensional (3D) measurement, and more particularly to a large-depth-range 3D measurement method, system, and device based on phase fusion. Sinusoidal fringes corresponding to multiple high-frequency binary fringe patterns varying in stripe width, a middle-frequency binary fringe pattern, and a low-frequency binary fringe pattern are formed and then projected onto a to-be-measured object. After modulated by height of the object, the sinusoidal fringes are collected, and wrapped phases of the collected sinusoidal fringes are calculated to determine absolute phases of high-frequency sinusoidal fringes. Phase errors of a high-frequency sinusoidal fringe under different fringe widths are calculated according to the defocusing degree. An optimal absolute phase is selected based on the phase errors for the large-depth range 3D measurement.

8 Claims, 3 Drawing Sheets

(56) References Cited

U.S. PATENT DOCUMENTS

| | | | | |
|---|---|---|---|---|
| 2014/0064603 A1* | 3/2014 | Zhang | ................ | G01B 11/2513 |
| | | | | 382/154 |
| 2022/0038676 A1* | 2/2022 | Liang | ...................... | G06T 7/521 |
| 2022/0357151 A1* | 11/2022 | Liang | ................ | G01B 11/2504 |

FOREIGN PATENT DOCUMENTS

| | | |
|---|---|---|
| CN | 108534714 A | 9/2018 |
| CN | 110375673 A | 10/2019 |
| CN | 113237437 A | 8/2021 |
| CN | 113344985 A | 9/2021 |
| CN | 113465545 A | 10/2021 |
| CN | 113551618 A | 10/2021 |

OTHER PUBLICATIONS

Ying Xu et al., Phase error compensation for three-dimensional shape measurement with projector defocusing, Jun. 10, 2011, Applied Optics, vol. 50, No. 17/10 (Year: 2011).*

Hongyuan Chen, Research on Key Technology of 3D Underwater Measurement Based on Grating Projection, Full-text Database of Chinese Outstanding Doctoral Dissertation (Master) Engineering Science and Technology II, Chapter 2.

Cuili Mao et al., Overview of the 3D Profilometry of Phase Shifting Fringe Projection, Acta Metrologica Sinica, vol. 39, No. 5, 2018, Section 3.1 of the text.

* cited by examiner

LARGE-DEPTH-RANGE THREE-DIMENSIONAL (3D) MEASUREMENT METHOD, SYSTEM, AND DEVICE BASED ON PHASE FUSION

CROSS-REFERENCE TO RELATED APPLICATIONS

This application claims the benefit of priority from Chinese Patent Application No. 202210413263.X, filed on Apr. 20, 2022. The content of the aforementioned application, including any intervening amendments thereto, is incorporated herein by reference in its entirety.

TECHNICAL FIELD

This application relates to optical three-dimensional (3D) measurement, and more particularly to a large-depth-range 3D measurement method, system, and device based on phase fusion.

BACKGROUND

Structured light three-dimensional (3D) measurement technology has currently received considerable attention in the 3D measurement, in which mainly the structured light is projected onto a measured object to determine its size parameters through deformation of the structured light. The existing structured light 3D measurement systems generally adopt a binary fringe defocused projection technology.

The principle of the binary fringe defocused projection technology is to blur a binary fringe into a standard sinusoidal fringe by using the defocusing effect. Excessive or insufficient defocusing of the binary fringe will lead to an increase in the wrapped phase error. Moreover, the defocusing degree increases with the increase of the distance from the focal plane. Therefore, with respect to the inappropriate defocusing degree occurring in the large-depth-of-field measurement, the phase error will be large.

SUMMARY

An object of the present disclosure is to provide a large-depth-range three-dimensional (3D) measurement method, system, and device based on phase fusion to solve the technical problem that the current structured light 3D measurement system based on binary fringe defocused projection technology cannot realize the large-depth-range 3D measurement.

Technical solutions of the present disclosure are described as follows.

In a first aspect, the present disclosure provides a large-depth-range 3D measurement method based on phase fusion, comprising:

generating a to-be-projected pattern set, wherein the to-be-projected pattern set comprises a plurality of high-frequency binary fringe patterns varying in fringe widths, a middle-frequency binary fringe pattern, and a low-frequency binary fringe pattern;

performing defocusing modulation on each pattern in the to-be-projected pattern set to form sinusoidal fringes to be projected onto a to-be-measured object;

modulating the sinusoidal fringes by height of the to-be-measured object, and collecting modulated sinusoidal fringes; carrying out phase demodulation on the modulated sinusoidal fringes by using an N-step phase-shifting method to obtain wrapped phases of the modulated sinusoidal fringes with different frequencies; and performing phase unwrapping on the modulated sinusoidal fringes with different frequencies by using a multi-frequency heterodyne method to obtain absolute phases of high-frequency sinusoidal fringes;

calculating a defocusing degree according to a modulation degree of the plurality of high-frequency binary fringe patterns varying in fringe width; and estimating phase errors of a corresponding high-frequency sinusoidal fringe under different fringe widths according to the defocusing degree;

selecting an absolute phase from the absolute phases of the high-frequency sinusoidal fringes as an optimal absolute phase according to the phase errors; and acquiring coordinates of a surface of the to-be-measured object according to a mapping relation between the optimal absolute phase and 3D coordinates to perform 3D reconstruction, so as to complete 3D measurement of the surface of the to-be-measured object.

In some embodiments, a modulation attenuation coefficient is introduced into the defocusing modulation to form the sinusoidal fringes, expressed as:

$$L_n^d(u_p, v_p) = \frac{E}{2} + \frac{2E}{\pi} \sum_{i=1}^{\infty} d^{(2i-1)^2} \frac{(-1)^{i+1}}{2i-1} \cos[(2i-1)(\varphi + sn)];$$

wherein n represents a pattern number; $L_n^d(u_p, v_p)$ represents a sinusoidal fringe formed by defocusing modulation of a $n^{th}$ pattern in the to-be-projected pattern set; $(u_p, v_p)$ represents a pattern pixel coordinate; represents the modulation attenuation coefficient; E represents a maximum grayscale value of patterns in the to-be-projected pattern set; i represents a cosine series number; φ represents a modulation phase; and s represents a phase-shift parameter.

In some embodiments, a relationship between the modulation attenuation coefficient and the defocusing degree is set as follows:

$$d = e^{-\frac{2\pi^2 \sigma_d^2}{T^2}};$$

wherein $\sigma_d$ represent the defocusing degree, and is equal to a standard deviation of a point spread function; and T represents a fringe width of a pattern currently undergoing the defocusing modulation.

In some embodiments, the wrapped phases of the modulated sinusoidal fringes with different frequencies are obtained through the following formula:

$$\varphi' = \arctan\left[\frac{\sum_{n=0}^{N-1} -L_n' \sin(sn)}{\sum_{n=0}^{N-1} L_n' \cos(sn)}\right] + \pi;$$

wherein N represents the number of projected patterns; s represents the phase-shift parameter; n represents the pattern number; $L_n'$ represents a sinusoidal fringe; and φ' represents a wrapped phase of the sinusoidal fringe $L_n'$.

In some embodiments, the absolute phases of the high-frequency sinusoidal fringes are obtained through the following formula:

$$\phi'_m = \mathrm{unwrap}(\varphi'_m, \varphi'_{mid}, \varphi'_{low}), m=1, 2, \ldots, M;$$

wherein $\phi'_m$ represents an absolute phase of an $m^{th}$ high-frequency sinusoidal fringe obtained through the multi-frequency heterodyne method; unwrap(•) represents an unwrapping function based on the multi-frequency heterodyne method; $\varphi'_m$ represents a wrapped phase of the $m^{th}$ high-frequency sinusoidal fringe; $\varphi'_{mid}$ is a wrapped phase of a middle-frequency sinusoidal fringe; $\varphi'_{low}$ represents a wrapped phase of a low-frequency sinusoidal fringe; and M represents the number of the high-frequency sinusoidal fringes, and is identical to the number of the plurality of high-frequency binary fringe patterns in the to-be-projected pattern set.

In some embodiments, the modulation degree of the plurality of high-frequency binary fringe patterns is calculated by the following formula:

$$B(T)' = \frac{2a_2 E}{\pi} d(T);$$

wherein T represents a fringe width of a pattern; B(T)' represents a modulation degree of a high-frequency binary fringe pattern; $a_2$ represents a response level of a harmonic signal; and d(T) represents a modulation attenuation coefficient of a high-frequency binary fringe pattern; and the defocusing degree is calculated by the following formula:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2 E}{\pi}\right) \\ \sigma_d^2 \end{bmatrix} = \ln \begin{bmatrix} B(T_1)' \\ \vdots \\ B(T_m)' \\ \vdots \\ B(T_M)' \end{bmatrix};$$

wherein $T_1$, $T_m$, and $T_M$ respectively represent a fringe width of a first high-frequency binary fringe pattern, an $m^{th}$ high-frequency binary fringe pattern, and an $M^{th}$ high-frequency binary fringe pattern in the to-be-projected pattern set; M represents the number of the plurality of high-frequency binary fringes patterns in the to-be-projected pattern set; $B(T_1)'$, $B(T_m)'$, and $B(T_M)'$ respectively represent a modulation degree of the first high-frequency binary fringe pattern, the $m^{th}$ high-frequency binary fringe pattern, and the $M^{th}$ high-frequency binary fringe pattern; and $\sigma_d$ represents the defocusing degree.

In some embodiments, the phase errors of a corresponding high-frequency sinusoidal fringe under different fringe widths are estimated by:

$$\sigma_\phi(T_m) = \frac{T_m}{2\pi} \sqrt{\frac{\pi^2 \sigma_n^2}{2d^2 E^2 a_2^2 N} + \frac{1}{2}\left\{\frac{d_{T_m}^{([N,2]-1)^2}-1}{[N,2]-1} + \frac{d_{T_m}^{([N,2]+1)^2}-1}{[N,2]+1}\right\}};$$

wherein $\sigma_\phi(T_m)$ represents an estimated phase error of a sinusoidal fringe under a fringe width of $T_m$; N represents the number of projected patterns; $\sigma_n$ represents a variance of random noise; [N,2] represents a least common multiple of N and 2; and $d_{T_m}$ represents a modulation attenuation coefficient of a high-frequency binary fringe pattern with a fringe width of $T_m$.

In some embodiments, an absolute phase corresponding to a minimum phase error in the absolute phases of the high-frequency sinusoidal fringes is selected as the optimal absolute phase.

In a second aspect, the present disclosure provides a large-depth-range 3D measurement system based on phase fusion, comprising:
a pattern generation module;
an imaging lens;
a camera lens; and
a measurement module;
wherein the pattern generation module is configured to generate a to-be-projected pattern set, wherein the to-be-projected pattern set comprises a plurality of high-frequency binary fringe patterns varying in fringe width, a middle-frequency binary fringe pattern, and a low-frequency binary fringe pattern;
the imaging lens is configured to perform defocusing modulation on each pattern in the to-be-projected pattern set to form sinusoidal fringes to be projected onto a to-be-measured object;
the camera lens is configured to collect sinusoidal fringes modulated by height of the to-be-measured object; and
the measurement module is configured to carry out phase demodulation on the sinusoidal fringes collected by the camera lens to obtain wrapped phases of the collected sinusoidal fringes with different frequencies by using an N-step phase-shifting method; perform phase unwrapping on the collected sinusoidal fringes by using a multi-frequency heterodyne method to obtain absolute phases of high-frequency sinusoidal fringes; calculate a defocusing degree according to a modulation degree of the plurality of high-frequency binary fringe patterns; estimate phase errors of a corresponding high-frequency sinusoidal fringe under different fringe widths according to the defocusing degree; select an absolute phase from the absolute phases of the high-frequency sinusoidal fringes as an optimal absolute phase according to the phase errors; and perform 3D reconstruction based on coordinates of a surface of the to-be-measured object acquired according to a mapping relation between the optimal absolute phase and 3D coordinates to complete 3D measurement of the surface of the to-be-measured object.

In some embodiments, the imaging lens is configured to introduce a modulation attenuation coefficient to the defocusing modulation to form the sinusoidal fringes, expressed as:

$$L_n^d(u_p, v_p) = \frac{E}{2} + \frac{2E}{\pi} \sum_{i=1}^{\infty} d^{(2i-1)^2} \frac{(-1)^{i+1}}{2i-1} \cos[(2i-1)(\varphi + sn)];$$

wherein n represents a pattern number; $L_n^d(u_p, v_p)$ represents a sinusoidal fringe formed by defocusing modulation of a $n^{th}$ pattern in the to-be-projected pattern set; $(u_p, v_p)$ represents a pattern pixel coordinate; d represents the modulation attenuation coefficient; E represents a maximum gray-scale value of patterns in the to-be-projected pattern set; i represents a cosine series number; $\varphi$ represents a modulation phase; and s represents a phase-shift parameter.

In some embodiments, the imaging lens is configured to set a relationship between the modulation attenuation coefficient and the defocusing degree as:

$$d = e^{-\frac{2\pi^2 \sigma_d^2}{T^2}};$$

wherein $\sigma_d$ represent the defocusing degree, and is equal to a standard deviation of a point spread function; and T represents a fringe width of a pattern currently undergoing the defocusing modulation.

In some embodiments, the measurement module comprises a wrapped phase calculation unit;

wherein the wrapped phase calculation unit is configured to solve wrapped phases of modulated sinusoidal fringes with different frequencies by:

$$\varphi' = \arctan\left[\frac{\sum_{n=0}^{N-1} -L'_n \sin(sn)}{\sum_{n=0}^{N-1} L'_n \cos(sn)}\right] + \pi;$$

wherein N represents the number of projected patterns; s represents the phase-shift parameter; n represents the pattern number; $L_n'$ represents a sinusoidal fringe; and $\varphi'$ represents a wrapped phase of the sinusoidal fringe $L_n'$.

In some embodiments, the measurement module further comprises an absolute phase calculation unit;

wherein the absolute phase calculation unit is configured to solve absolute phases of high-frequency sinusoidal fringes by:

$$\phi'_m = \mathrm{unwrap}(\varphi'_m, \varphi'_{mid}, \varphi'_{low}), m=1,2,\ldots,M;$$

wherein $\phi'_m$ represents an absolute phase of a $m^{th}$ high-frequency sinusoidal fringe obtained through the multi-frequency heterodyne method; unwrap(•) represents an unwrapping function based on the multi-frequency heterodyne method; $\varphi'_m$ represents a wrapped phase of the $m^{th}$ high-frequency sinusoidal fringe; $\varphi'_{mid}$ is a wrapped phase of a middle-frequency sinusoidal fringe; $\varphi'_{low}$ represents a wrapped phase of a low-frequency sinusoidal fringe; and M represents the number of the high-frequency sinusoidal fringes, and is identical to the number of the plurality of high-frequency binary fringe patterns in the to-be-projected pattern set.

In some embodiments, the measurement module further comprises a modulation degree calculation unit and a defocusing degree calculation unit;

wherein the modulation degree calculation unit is configured to calculate the modulation degree of the plurality of high-frequency binary fringe patterns by:

$$B(T)' = \frac{2a_2 E}{\pi} d(T);$$

wherein T represents a fringe width of a pattern; $B(T)'$ represents a modulation degree of a high-frequency binary fringe pattern; $a_2$ represents a response level of a harmonic signal; and $d(T)$ represents a modulation attenuation coefficient of a high-frequency binary fringe pattern; and the defocusing degree calculation unit is configured to calculate the defocusing degree by:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2 E}{\pi}\right) \\ \sigma_d^2 \end{bmatrix} = \ln\begin{bmatrix} B(T_1)' \\ \vdots \\ B(T_m)' \\ \vdots \\ B(T_M)' \end{bmatrix};$$

wherein $T_1$, $T_m$, and $T_M$ respectively represent a fringe width of a first high-frequency binary fringe pattern, an $m^{th}$ high-frequency binary fringe pattern, and an $M^{th}$ high-frequency binary fringe pattern in the to-be-projected pattern set; M represents the number of the plurality of high-frequency binary fringes patterns in the to-be-projected pattern set; $B(T_1)'$, $B(T_m)'$, and $B(T_M)'$ respectively represent a modulation degree of the first high-frequency binary fringe pattern, the $m^{th}$ high-frequency binary fringe pattern, and the $M^{th}$ high-frequency binary fringe pattern; and $\sigma_d$ represents the defocusing degree.

In some embodiments, the measurement module further comprises a phase error estimation unit;

wherein the phase error estimation unit is configured to estimate phase errors of a corresponding high-frequency sinusoidal fringe under different fringe widths by:

$$\sigma_\phi(T_m) = \frac{T_m}{2\pi}\sqrt{\frac{\pi^2 \sigma_n^2}{2d^2 E^2 a_2^2 N} + \frac{1}{2}\left\{\frac{d_{T_m}^{([N,2]-1)^2-1}}{[N,2]-1} + \frac{d_{T_m}^{([N,2]+1)^2-1}}{[N,2]+1}\right\}};$$

wherein $\sigma_\phi(T_m)$ represents an estimated phase error of a sinusoidal fringe under a fringe width of $T_m$; N represents the number of projected patterns; $\sigma_n$ represents a variance of random noise; [N,2] represents a least common multiple of N and 2; and $d_{T_m}$ represents a modulation attenuation coefficient of a high-frequency binary fringe pattern with a fringe width of $T_m$.

In some embodiments, the measurement module further comprises an optimal absolute phase determination unit;

wherein the optimal absolute phase determination unit is configured to select an absolute phase corresponding to a minimum phase error in the absolute phases of the high-frequency sinusoidal fringes as the optimal absolute phase.

In a third aspect, the present disclosure provides a large-depth-range 3D measurement method based on phase fusion, comprising:

performing, by an imaging lens, defocusing modulation on a to-be-projected pattern set to form sinusoidal fringes to be projected onto a to-be-measured object, wherein the to-be-projected pattern set comprises a plurality of high-frequency binary fringe patterns with different fringe widths, a middle-frequency binary fringe pattern, and a low-frequency binary fringe pattern;

collecting, by a camera lens, sinusoidal fringes modulated by height of the to-be-measured object;

carrying out phase demodulation, by a measurement module, on the sinusoidal fringes collected by the camera lens to obtain wrapped phases of the collected sinusoidal fringes with different frequencies by using an N-step phase-shifting method; and performing, by the measurement module, phase unwrapping on the collected sinusoidal fringes with different frequencies by using a multi-frequency heterodyne method to obtain absolute phases of high-frequency sinusoidal fringes;

calculating, by the measurement module, a defocusing degree according to a modulation degree of the plurality of high-frequency binary fringe patterns; and estimating, by the measurement module, phase errors of a corresponding high-frequency sinusoidal fringe under different fringe widths according to the defocusing degree;

selecting, by the measurement module, an absolute phase from the absolute phases of the high-frequency sinusoidal fringes as an optimal absolute phase according to the phase errors; and acquiring, by the measurement module, coordinates of a surface of the to-be-measured object according to a mapping relation between the optimal absolute phase and 3D coordinates; and performing, by the measurement module, 3D reconstruction to complete 3D measurement of the surface of the to-be-measured object.

In a fourth aspect, the present disclosure provides a large-depth-range 3D measurement device based on phase fusion, comprising:

a memory; and a processor;

wherein the memory is configured to store an instruction; the instruction is configured to implement the aforementioned large-depth-range 3D measurement method; and the processor is configured to execute the instruction stored in the memory.

In a fifth aspect, the present disclosure provides a computer-readable storage medium, wherein the computer-readable storage medium stores a computer program; and the computer program is configured to be executed by a processor to implement the aforementioned large-depth-range 3D measurement method.

Compared to the prior art, the present disclosure has the following beneficial effects.

In this application, sinusoidal fringes corresponding to a plurality of high-frequency binary fringe patterns varying in fringe width, a middle-frequency binary fringe pattern, and a low-frequency binary fringe pattern are formed and then projected onto a to-be-measured object. Then the sinusoidal fringes modulated by height of the to-be-measured object are collected, and the wrapped phases of the collected sinusoidal fringes are calculated to determine absolute phases of high-frequency sinusoidal fringes. Phase errors of a high-frequency sinusoidal fringe under different fringe widths are calculated according to the defocusing degree. After that, an optimal absolute phase is selected from the absolute phases based on the phase errors for the large-depth range 3D measurement. In this application, the wrapped phases of the sinusoidal fringes with different frequencies are subjected to phase unwrapping to obtain the absolute phases, which can effectively improve the absolute phase calculation accuracy. Moreover, application of the optimal absolute phase determined based on the phase error for the 3D measurement in a large-depth range can reduce the phase error caused by the inappropriate defocusing degree, and effectively realize the large-depth-range 3D measurement.

BRIEF DESCRIPTION OF THE DRAWINGS

To illustrate the technical solutions in the embodiments of the present disclosure or the prior art more clearly, the accompanying drawings used in the description of the embodiments or the prior art will be described briefly below. The accompanying drawings only illustrate some embodiments of the present disclosure, and other drawings can be obtained by one of ordinary skill in the art without paying any creative efforts from these drawings.

Figure 1:
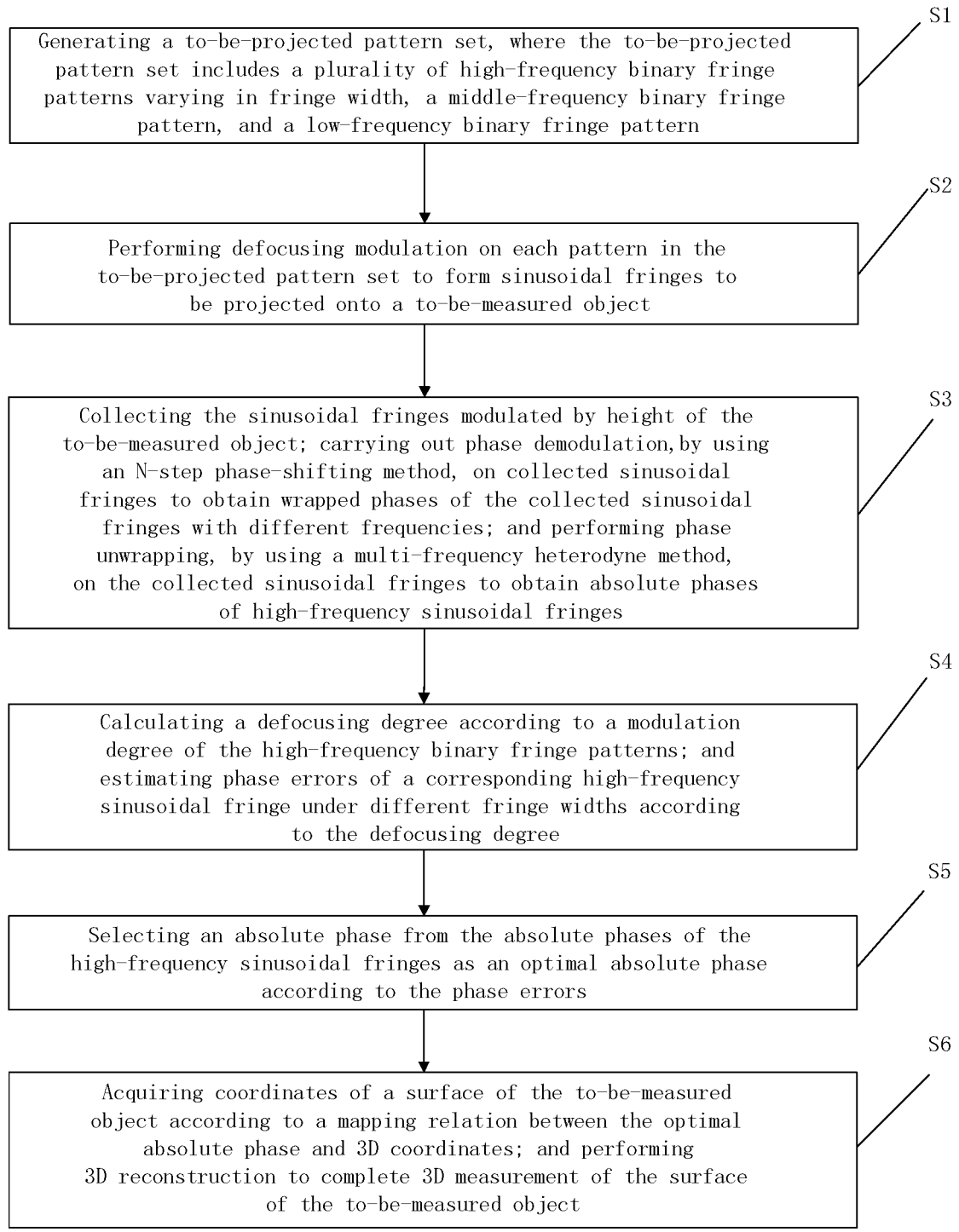
FIG. 1 is a flow chart of a large-depth-range three-dimensional (3D) measurement method based on phase fusion according to an embodiment of the present disclosure.

In the drawings, 1, pattern generation module; 2, imaging lens; 3, camera lens; and 4, measurement module.

DETAILED DESCRIPTION OF EMBODIMENTS

The present disclosure provides a large-depth-range three-dimensional (3D) measurement method, system, and device based on phase fusion, which solves the technical problem that the current structured light 3D measurement system based on binary fringe defocused projection technology cannot realize the large-depth-range 3D measurement.

To make the objects, features, and advantages of the present disclosure clearer, the technical solutions in the embodiments of the present disclosure will be clearly and completely described below with reference to the accompanying drawings. Described below are only some embodiments of the present disclosure, which are not intended to limit the disclosure. Based on the embodiments in the present disclosure, all other embodiments obtained by one of ordinary skill in the art without paying creative work shall fall within the scope of the present disclosure.

In a first aspect, the present disclosure provides a large-depth-range 3D measurement method based on phase fusion.

An embodiment illustrated in FIG. 1 provides a large-depth-range 3D measurement method based on phase fusion, which includes the following steps.

(S1) A to-be-projected pattern set is generated, where the to-be-projected pattern set includes a plurality of high-frequency binary fringe patterns varying in fringe width, a middle-frequency binary fringe pattern, and a low-frequency binary fringe pattern.

In an embodiment, a pattern generation module is configured to generate the to-be-projected pattern set.

Specifically, binary fringe patterns with different frequencies are formed through the following formulas:

$$\begin{cases} I_n^s(u_p, v_p) = E/2 \times \left[1 + \cos\left(\frac{2\pi}{T}x + sn\right)\right] \\ I_n^p(u_p, v_p) = \begin{cases} 0, I_n^s(u_p, v_p) < E/2 \\ E, I_n^s(u_p, v_p) \geq E/2 \end{cases} \end{cases};$$

where $(u_p, v_p)$ represents a pattern pixel coordinate; $I_n^s(u_p, v_p)$ represents a sinusoidal fringe pattern; $I_n^p(u_p, v_p)$ represents a binary fringe pattern formed by binarization of the sinusoidal fringe pattern $I_n^s(u_p, v_p)$; n represents a pattern number; s represents a phase-shift parameter, and $s=2\pi/N$; N represents the number of projected patterns; T represents a fringe width; and E represents a maximum gray-scale value of binary fringe patterns in a to-be-projected pattern set.

The binary fringe pattern $I_n^p$ can be expressed in the following cosinoidal series form:

$$I_n^p = \frac{E}{2} + \frac{2E}{\pi} \sum_{i=1}^{\infty} \frac{(-1)^{i+1}}{2i-1} \cos[(2i-1)(\varphi + sn)];$$

where i represents a cosine series number; and φ represents a modulation phase.

(S2) Defocusing modulation is performed on each pattern in the to-be-projected pattern set to form sinusoidal fringes to be projected onto a to-be-measured object.

Specifically, each sinusoidal fringe is projected onto the to-be-measured object in turn, and modulated by height of the to-be-measured object, and the modulated sinusoidal fringe is collected by the camera lens simultaneously.

The binary fringes are blurred into sinusoidal fringes by the defocusing effect of the projection. The defocusing affect on the projected fringes is similar to Gaussian filtering. Since the convolution in the spatial domain is equivalent to the frequency domain multiplication. The binary fringes after defocusing can be expressed by the following formula:

$$L^d = I^p \otimes \frac{1}{\sqrt{2\pi}\,\sigma_d} e^{-\frac{(u_p^2+v_p^2)}{2\sigma_d^2}};$$

where $L^d$ represents binary fringes after defocusing; $I^p$ represents binary fringes before defocusing; $\sigma^d$ represents a standard deviation of a point spread function, reflecting a defocusing degree of a projection; and $(u_p, v_p)$ represents a pattern pixel coordinate.

A modulation attenuation coefficient is introduced into the defocusing modulation to form the sinusoidal fringes, expressed as follows:

$$L_n^d(u_p, v_p) = \frac{E}{2} + \frac{2E}{\pi}\sum_{i=1}^{\infty} d^{(2i-1)^2}\frac{(-1)^{i+1}}{2i-1}\cos[(2i-1)(\varphi + sn)];$$

where n represents a pattern number; $L_n^d(u_p, v_p)$ represents a sinusoidal fringe formed by defocusing modulation of a $n^{th}$ pattern in the to-be-projected pattern set; $(u_p, v_p)$ represents a pattern pixel coordinate; d represents the modulation attenuation coefficient; E represents a maximum grayscale value of patterns in the to-be-projected pattern set; i represents a cosine series number; φ represents a modulation phase; and s represents a phase-shift parameter;

a relationship between the modulation attenuation coefficient and the defocusing degree is set as follows:

$$d = e^{-\frac{2\pi^2\sigma_d^2}{T^2}};$$

where $\sigma_d$ represent the defocusing degree, and is equal to a standard deviation of a point spread function; and T represents a fringe width of a pattern currently undergoing the defocusing modulation.

(S3) The sinusoidal fringes are modulated by height of the to-be-measured object, and the modulated sinusoidal fringes are collected. Phase demodulation is carried out on the modulated sinusoidal fringes to obtain wrapped phases of the modulated sinusoidal fringes with different frequencies by using an N-step phase-shifting method. Phase unwrapping is performed on the modulated sinusoidal fringes with different frequencies by using a multi-frequency heterodyne method to obtain absolute phases of high-frequency sinusoidal fringes.

In an embodiment, the wrapped phases of the modulated sinusoidal fringes with different frequencies are obtained through the following formula:

$$\varphi' = \arctan\left[\frac{\sum_{n=0}^{N-1} -L_n'\sin(sn)}{\sum_{n=0}^{N-1} L_n'\cos(sn)}\right] + \pi;$$

where N represents the number of projected patterns; s represents the phase-shift parameter; n represents the pattern number; $L_n'$ represents a sinusoidal fringe; and φ' represents a wrapped phase of the sinusoidal fringe $L_n'$.

In an embodiment, a four-step phase-shifting method is used, where the phase shift of each step is set as π/2.

In an embodiment, the absolute phases of the high-frequency sinusoidal fringes are obtained through the following formula:

$$\phi'_m = \mathrm{unwrap}(\varphi'_m, \varphi'_{mid}, \varphi'_{low}), m=1,2,\ldots,M;$$

where $\phi'_m$ represents an absolute phase of an $m^{th}$ high-frequency sinusoidal fringe obtained through the multi-frequency heterodyne method; unwrap(•) represents an unwrapping function based on the multi-frequency heterodyne method; $\varphi'_m$ represents a wrapped phase of the $m^{th}$ high-frequency sinusoidal fringe; $\varphi'_{mid}$ is a wrapped phase of a middle-frequency sinusoidal fringe; $\varphi'_{low}$ represents a wrapped phase of a low-frequency sinusoidal fringe; and M represents the number of the high-frequency sinusoidal fringes, and is identical to the number of the plurality of high-frequency binary fringe patterns in the to-be-projected pattern set.

Since the calculation of the unwrapping function based on the multi-frequency heterodyne method can refer to the prior art, it is not limited in the embodiments of the present disclosure.

(S4) A defocusing degree is calculated according to a modulation degree of the plurality of high-frequency binary fringe patterns varying int fringe widths. Phase errors of a corresponding high-frequency sinusoidal fringe under different fringe widths are estimated according to the defocusing degree.

In an embodiment, the modulation degree of the plurality of high-frequency binary fringe patterns is calculated by the following formula:

$$B(T)' = \frac{2a_2 E}{\pi} d(T);$$

where T represents a fringe width of a pattern; B(T)' represents a modulation degree of a high-frequency binary fringe pattern; $a_2$ represents a response level of a harmonic signal; and d(T) represents a modulation attenuation coefficient of a high-frequency binary fringe pattern; and the defocusing degree is calculated by the following formula:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2 E}{\pi}\right) \\ \sigma_d^2 \end{bmatrix} = \ln\begin{bmatrix} B(T_1)' \\ \vdots \\ B(T_m)' \\ \vdots \\ B(T_M)' \end{bmatrix};$$

where $T_1$, $T_m$, and $T_M$ respectively represent a fringe width of a first high-frequency binary fringe pattern, an $m^{th}$ high-frequency binary fringe pattern, and an $M^{th}$ high-frequency binary fringe pattern in the to-be-projected pattern set; M represents the number of the plurality of high-frequency binary fringes patterns in the to-be-projected pattern set; $B(T_1)'$, $B(T_m)'$, and $B(T_M)'$ respectively represent a modulation degree of the first high-frequency binary fringe pattern, the $m^{th}$ high-frequency binary fringe pattern, and the $M^{th}$ high-frequency binary fringe pattern; and $\sigma_d$ represents the defocusing degree.

In this embodiment, the relationship equation between the modulation degree and defocusing degree is provided, which is beneficial to improve the calculation efficiency of the defocusing degree, thereby improving the efficiency of 3D measurement.

In an embodiment, the phase errors of a corresponding high-frequency sinusoidal fringe under different fringe widths are estimated by:

$$\sigma_\phi(T_m) = \frac{T_m}{2\pi} \sqrt{\frac{\pi^2 \sigma_n^2}{2d^2 E^2 a_2^2 N} + \frac{1}{2}\left\{\frac{d_{T_m}^{([N,2]-1)^2-1}}{[N,2]-1} + \frac{d_{T_m}^{([N,2]+1)^2-1}}{[N,2]+1}\right\}};$$

where $\sigma_\phi(T_m)$ represents an estimated phase error of a sinusoidal fringe under a fringe width of $T_m$; N represents the number of projected patterns; an represents a variance of random noise; [N,2] represents a least common multiple of N and 2; and $d_{T_m}$ represents a modulation attenuation coefficient of a high-frequency binary fringe pattern with a fringe width of $T_m$.

In this embodiment, the calculation formula of the phase errors of a corresponding high-frequency sinusoidal fringe under different fringe widths is provided, which can quickly calculate the phase errors of a corresponding high-frequency sinusoidal fringe under different fringe widths.

(S5) An absolute phase is selected from the absolute phases of the high-frequency sinusoidal fringes as an optimal absolute phase according to the phase errors.

In an embodiment, an absolute phase corresponding to a minimum phase error in the absolute phases of the high-frequency sinusoidal fringes is selected as the optimal absolute phase.

In an embodiment, the absolute phase corresponding to the minimum phase error and the absolute phase corresponding to the second smallest phase error are selected from the absolute phase of the high-frequency sinusoidal fringes, and the selected absolute phases are averaged as the optimal absolute phase.

(S6) Coordinates of a surface of the to-be-measured object are acquired according to a mapping relation between the optimal absolute phase and 3D coordinates to perform 3D reconstruction, so as to complete 3D measurement of the surface of the to-be-measured object.

In a second aspect, the present disclosure provides a large-depth-range 3D measurement system based on phase fusion.

Figure 2:
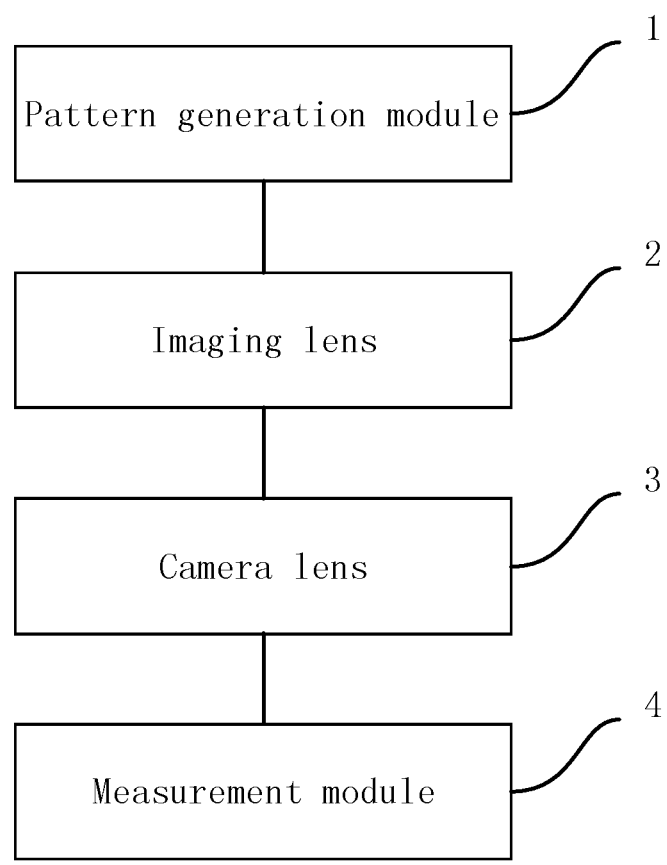
FIG. 2 is a block diagram of a large-depth-range 3D measurement system based on phase fusion according to an embodiment of the present disclosure.

An embodiment illustrated in FIG. 2 provides a large-depth-range 3D measurement system, which includes a pattern generation module 1, an imaging lens 2, a camera lens 3, and a measurement module 4.

The pattern generation module 1 is configured to generate a to-be-projected pattern set, wherein the to-be-projected pattern set includes a plurality of high-frequency binary fringe patterns varying in fringe widths, a middle-frequency binary fringe pattern, and a low-frequency binary fringe pattern;

The imaging lens 2 is configured to perform defocusing modulation on each pattern in the to-be-projected pattern set to form sinusoidal fringes to be projected onto a to-be-measured object;

The camera lens 3 is configured to collect sinusoidal fringes modulated by height of the to-be-measured object; and The measurement module 4 is configured to carry out phase demodulation on the sinusoidal fringes collected by the camera lens 3 to obtain wrapped phases of the collected sinusoidal fringes with different frequencies by using an N-step phase-shifting method; perform phase unwrapping on the collected sinusoidal fringes by using a multi-frequency heterodyne method to obtain absolute phases of high-frequency sinusoidal fringes; calculate a defocusing degree according to a modulation degree of the plurality of high-frequency binary fringe patterns; estimate phase errors of a corresponding high-frequency sinusoidal fringe under different fringe widths according to the defocusing degree; select an absolute phase from the absolute phases of the high-frequency sinusoidal fringes as an optimal absolute phase according to the phase errors; and perform 3D reconstruction based on coordinates of a surface of the to-be-measured object acquired according to a mapping relation between the optimal absolute phase and 3D coordinates to complete 3D measurement of the surface of the to-be-measured object.

In an embodiment, the imaging lens 2 is configured to introduce a modulation attenuation coefficient into the defocusing modulation to form the sinusoidal fringes, expressed as:

$$L_n^d(u_p, v_p) = \frac{E}{2} + \frac{2E}{\pi} \sum_{i=1}^{\infty} d^{(2i-1)^2} \frac{(-1)^{i+1}}{2i-1} \cos[(2i-1)(\varphi + sn)];$$

where n represents a pattern number; $L_n^d(u_p, v_p)$ represents a sinusoidal fringe formed by defocusing modulation of a $n^{th}$ pattern in the to-be-projected pattern set; $(u_p, v_p)$ represents a pattern pixel coordinate; d represents the modulation attenuation coefficient; E represents a maximum grayscale value of patterns in the to-be-projected pattern set; i represents a cosine series number; φ represents a modulation phase; and s represents a phase-shift parameter.

In an embodiment, the imaging lens is configured to set a relationship between the modulation attenuation coefficient and the defocusing degree as:

$$d = e^{-\frac{2\pi^2 \sigma_d^2}{T^2}};$$

where $\sigma_d$ represent the defocusing degree, and is equal to a standard deviation of a point spread function; and T represents a fringe width of a pattern currently undergoing the defocusing modulation.

In an embodiment, the measurement module 4 includes a wrapped phase calculation unit;

where the wrapped phase calculation unit is configured to solve wrapped phases of modulated sinusoidal fringes with different frequencies by:

$$\varphi' = \arctan\left[\frac{\sum_{n=0}^{N-1} -L'_n \sin(sn)}{\sum_{n=0}^{N-1} L'_n \cos(sn)}\right] + \pi;$$

where N represents the number of projected patterns; s represents the phase-shift parameter; n represents the pattern number; $L_n'$ represents a sinusoidal fringe; and $\varphi'$ represents a wrapped phase of the sinusoidal fringe $L_n'$.

In an embodiment, the measurement module 4 further includes an absolute phase calculation unit;

where the absolute phase calculation unit is configured to solve absolute phases of high-frequency sinusoidal fringes by:

$$\phi'_m = \mathrm{unwrap}(\varphi'_m, \varphi'_{mid}, \varphi'_{low}), m=1,2,\ldots,M;$$

where $\phi'_m$ represents an absolute phase of an $m^{th}$ high-frequency sinusoidal fringe obtained through the multi-frequency heterodyne method; unwrap(•) represents an unwrapping function based on the multi-frequency heterodyne method; $\varphi'_m$ represents a wrapped phase of the $m^{th}$ high-frequency sinusoidal fringe; $\varphi'_{mid}$ is a wrapped phase of a middle-frequency sinusoidal fringe; $\varphi'_{low}$ represents a wrapped phase of a low-frequency sinusoidal fringe; and M represents the number of the high-frequency sinusoidal fringes, and is identical to the number of the plurality of high-frequency binary fringe patterns in the to-be-projected pattern set.

In an embodiment, the measurement module 4 further includes a modulation degree calculation unit and a defocusing degree calculation unit;

where the modulation degree calculation unit is configured to calculate the modulation degree of the plurality of high-frequency binary fringe patterns with different fringe widths by:

$$B(T)' = \frac{2a_2 E}{\pi} d(T);$$

where T represents a fringe width of a pattern; B(T)' represents a modulation degree of a high-frequency binary fringe pattern; $a_2$ represents a response level of a harmonic signal; and d(T) represents a modulation attenuation coefficient of a high-frequency binary fringe pattern; and the defocusing degree calculation unit is configured to calculate the defocusing degree by:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2 E}{\pi}\right) \\ \sigma_d^2 \end{bmatrix} = \ln \begin{bmatrix} B(T_1)' \\ \vdots \\ B(T_m)' \\ \vdots \\ B(T_M)' \end{bmatrix};$$

where $T_1$, $T_m$, and $T_M$ respectively represent a fringe width of a first high-frequency binary fringe pattern, an $m^{th}$ high-frequency binary fringe pattern, and an $M^{th}$ high-frequency binary fringe pattern in the to-be-projected pattern set; M represents the number of the plurality of high-frequency binary fringes patterns in the to-be-projected pattern set; $B(T_1)'$, $B(T_m)'$, and $B(T_M)'$ respectively represent a modulation degree of the first high-frequency binary fringe pattern, the $m^{th}$ high-frequency binary fringe pattern, and the $M^{th}$ high-frequency binary fringe pattern; and $\sigma_d$ represents the defocusing degree.

In an embodiment, the measurement module 4 further includes a phase error estimation unit;

where the phase error estimation unit is configured to estimate phase errors of a corresponding high-frequency sinusoidal fringe under different fringe widths by:

$$\sigma_\phi(T_m) = \frac{T_m}{2\pi} \sqrt{\frac{\pi^2 \sigma_n^2}{2d^2 E^2 a_2^2 N} + \frac{1}{2}\left\{\frac{d_{T_m}^{([N,2]-1)^2-1}}{[N,2]-1} + \frac{d_{T_m}^{([N,2]+1)^2-1}}{[N,2]+1}\right\}};$$

where $\sigma_\phi(T_m)$ represents an estimated phase error of a sinusoidal fringe under a fringe width of $T_m$; N represents the number of projected patterns; $\sigma_n$ represents a variance of random noise; [N,2] represents a least common multiple of N and 2; and $d_{T_m}$ represents a modulation attenuation coefficient of a high-frequency binary fringe pattern with a fringe width of $T_m$.

In an embodiment, the measurement module 4 further includes an optimal absolute phase determination unit;

where the optimal absolute phase determination unit is configured to select an absolute phase corresponding to a minimum phase error in the absolute phases of the high-frequency sinusoidal fringes as the optimal absolute phase.

It will be clear to those skilled in the art that, for brevity of description, the specific working processes of the systems, modules and units described above can be referred to the corresponding processes in the aforementioned method. The specific beneficial effects of the systems, modules and units described above can be referred to the corresponding beneficial effects in the aforementioned method and will not be repeated here.

In a third aspect, the present disclosure provides a large-depth-range 3D measurement method based on phase fusion.

Figure 3:
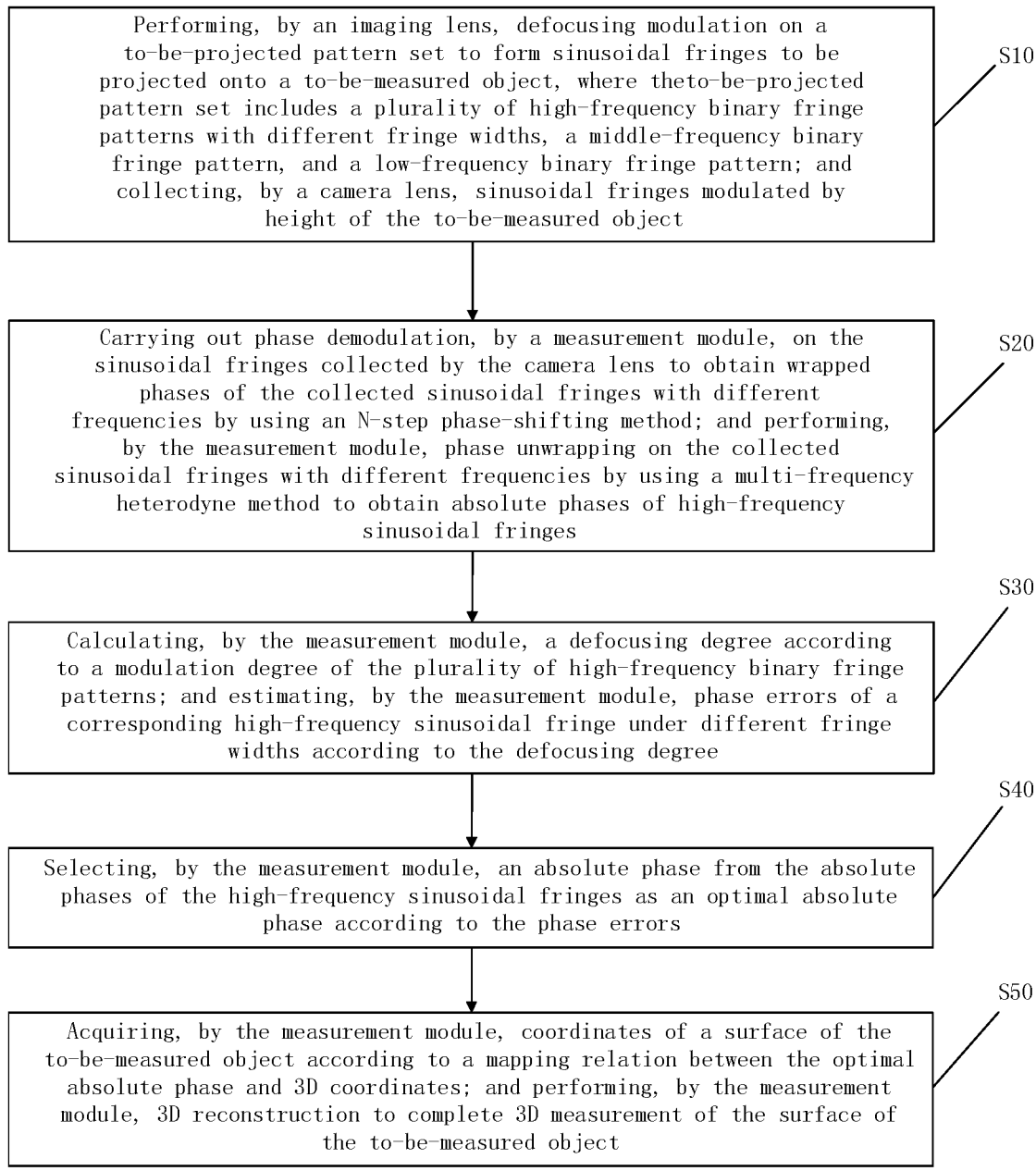
FIG. 3 is a flow chart of a large-depth-range 3D measurement method implemented by a measurement module according to an embodiment of the present disclosure.

An embodiment illustrated in FIG. 3 provides a large-depth-range 3D measurement method based on phase fusion, which includes the following steps.

(S10) Defocusing modulation is performed by an imaging lens on a to-be-projected pattern set to form sinusoidal fringes to be projected onto a to-be-measured object, where the to-be-projected pattern set includes a plurality of high-frequency binary fringe patterns varying in fringe width, a middle-frequency binary fringe pattern, and a low-frequency binary fringe pattern. Sinusoidal fringes modulated by height of the to-be-measured object are collected by a camera lens.

(S20) Phase demodulation is carried out by a measurement module on the modulated sinusoidal fringes to obtain wrapped phases of the collected sinusoidal fringes with different frequencies by using an N-step phase-shifting method. Phase unwrapping is performed on the collected sinusoidal fringes with different frequencies by using a multi-frequency heterodyne method to obtain absolute phases of high-frequency sinusoidal fringes.

(S30) A defocusing degree is calculated by the measurement module according to a modulation degree of the plurality of high-frequency binary fringe patterns. Phase errors of a corresponding high-frequency sinusoidal fringe under different fringe widths are estimated by the measurement module according to the defocusing degree.

(S40) An absolute phase is selected by the measurement module from the absolute phases of the high-frequency sinusoidal fringes as an optimal absolute phase according to the phase errors.

(S50) Coordinates of a surface of the to-be-measured object are acquired by the measurement module according to a mapping relation between the optimal absolute phase and 3D coordinates to perform 3D reconstruction, so as to complete 3D measurement of the surface of the to-be-measured object.

It should be noted that the specific implementations of each step in the method of this embodiment can be referred to the steps performed by the measurement module in the aforementioned system when implementing specific functions, and thus will not be repeated here.

In a fourth aspect, the present disclosure provides a large-depth-range 3D measurement device based on phase fusion, which includes a memory and a processor; where the memory is configured to store an instruction; the instruction is configured to implement the aforementioned large-depth-range 3D measurement method; and the processor is configured to execute the instruction stored in the memory.

In a fifth aspect, the present disclosure provides a computer-readable storage medium, where the computer-readable storage medium stores a computer program; and the computer program is configured to be executed by a processor to implement the aforementioned large-depth-range 3D measurement method.

In this application, phase unwrapping is performed on the wrapped phase of the sinusoidal fringes with different frequencies to obtain the absolute phases, which can effectively improve the calculation accuracy of the absolute phases. Moreover, the optimal absolute phase is determined based on the phase error for the 3D measurement in a large-depth range, which can reduce the phase error caused by the inappropriate defocusing degree, and effectively realize the 3D measurement in a large-depth range.

In the above embodiments provided in this application, it should be understood that the disclosed systems, devices, and methods can be implemented in other ways. For example, the system described above are merely schematic. To be specific, the units are divided merely in a logical functional manner in this application, and can be divided in other ways when actually implemented. For example, multiple units can be combined or integrated into another system, or some features can be ignored, or not be implemented.

The units described as separate components may or may not be physically separated. Some or all of these units may be selected as needed to achieve the object.

Moreover, functional units in each embodiment of the present disclosure may be integrated in a single processing unit, or physically exist separately. Alternatively, two or more units may be integrated in a single unit. The above integrated units can be implemented either in the form of hardware or in the form of software functional units.

The integrated unit may be stored in a computer-readable storage medium when implemented as a software functional module and sold or used as a separate product. Based on this point, the technical solutions of the present disclosure, or part of the technical solution that essentially contributes to the prior art, may be embodied in the form of a software product, and stored in a storage medium, including instructions to enable a computer device (i.e., a personal computer, a server, and a network device) to perform all or part of the steps of the methods described in the above embodiments of the present disclosure. The aforementioned storage medium can be a universal serial bus (USB) flash drive, a mobile hard drive, a read-only memory (ROM), a random access memory (RAM), a disk, a compact disc (CD), or a medium that can store program codes.

The above embodiments are merely illustrative of the disclosure, and are not intended to limit the disclosure. It should be understood that any modifications, variations and replacements made by those skilled in the art without departing from the spirit and scope of the disclosure shall fall within the scope of the disclosure defined by the appended claims.

What is claimed is:

1. A large-depth-range three-dimensional (3D) measurement method based on phase fusion, comprising:

generating a to-be-projected pattern set, wherein the to-be-projected pattern set comprises a plurality of high-frequency binary fringe patterns varying in fringe width, a middle-frequency binary fringe pattern, and a low-frequency binary fringe pattern;

performing defocusing modulation on each pattern in the to-be-projected pattern set to form sinusoidal fringes to be projected onto a to-be-measured object;

modulating the sinusoidal fringes by height of the to-be-measured object, and collecting modulated sinusoidal fringes; carrying out phase demodulation on the modulated sinusoidal fringes by using an N-step phase-shifting method to obtain wrapped phases of the modulated sinusoidal fringes with different frequencies; and performing phase unwrapping on the modulated sinusoidal fringes with different frequencies by using a multi-frequency heterodyne method to obtain absolute phases of high-frequency sinusoidal fringes;

calculating a defocusing degree according to a modulation degree of the plurality of high-frequency binary fringe patterns varying in fringe width; and estimating phase errors of a corresponding high-frequency sinusoidal fringe under different fringe widths according to the defocusing degree;

selecting an absolute phase from the absolute phases of the high-frequency sinusoidal fringes as an optimal absolute phase according to the phase errors; and acquiring coordinates of a surface of the to-be-measured object according to the optimal absolute phase to perform 3D reconstruction, so as to complete 3D measurement of the surface of the to-be-measured object.

2. The large-depth-range 3D measurement method of claim 1, wherein a modulation attenuation coefficient is introduced into the defocusing modulation to form the sinusoidal fringes expressed as follows:

$$L_n^d(u_p, v_p) = \frac{E}{2} + \frac{2E}{\pi}\sum_{i=1}^{\infty} d^{(2i-1)^2}\frac{(-1)^{i+1}}{2i-1}\cos[(2i-1)(\varphi + sn)];$$

wherein n represents a pattern number; $L_n^d(u_p, v_p)$ represents a sinusoidal fringe formed by defocusing modulation of a $n^{th}$ pattern in the to-be-projected pattern set; $(u_p, v_p)$ represents a pattern pixel coordinate; d represents the modulation attenuation coefficient; E represents a maximum gray-scale value of patterns in the to-be-projected pattern set; i represents a cosine series number; $\varphi$ represents a modulation phase; and s represents a phase-shift parameter.

3. The large-depth-range 3D measurement method of claim 2, wherein a relationship between the modulation attenuation coefficient and the defocusing degree is set as follows:

$$d = e^{-\frac{2\pi^2 \sigma_d^2}{T^2}};$$

wherein $\sigma_d$ represent the defocusing degree, and is equal to a standard deviation of a point spread function; and T represents a fringe width of a pattern currently undergoing the defocusing modulation.

4. The large-depth-range 3D measurement method of claim 2, wherein the wrapped phases of the modulated sinusoidal fringes with different frequencies are obtained through the following formula:

$$\varphi' = \arctan\left[\frac{\sum_{n=0}^{N-1} -L'_n \sin(sn)}{\sum_{n=0}^{N-1} L'_n \cos(sn)}\right] + \pi;$$

wherein N represents the number of projected patterns; s represents the phase-shift parameter; n represents the pattern number; $L_n'$ represents a sinusoidal fringe; and $\varphi'$ represents a wrapped phase of the sinusoidal fringe $L_n'$.

5. The large-depth-range 3D measurement method of claim 4, wherein the absolute phases of the high-frequency sinusoidal fringes are obtained through the following formula:

$$\phi'_m = \mathrm{unwrap}(\varphi'_m, \varphi'_{mid}, \varphi'_{low}), m=1,2,\ldots,M;$$

wherein $\phi'_m$ represents an absolute phase of a $m^{th}$ high-frequency sinusoidal fringe obtained through the multi-frequency heterodyne method; unwrap(•) represents an unwrapping function based on the multi-frequency heterodyne method; $\varphi'_m$ represents a wrapped phase of the $m^{th}$ high-frequency sinusoidal fringe; $\varphi'_{mid}$ is a wrapped phase of a middle-frequency sinusoidal fringe; $\varphi'_{low}$ represents a wrapped phase of a low-frequency sinusoidal fringe; and M represents the number of the high-frequency sinusoidal fringes, and is identical to the number of the plurality of high-frequency binary fringe patterns in the to-be-projected pattern set.

6. The large-depth-range 3D measurement method of claim 2, wherein the modulation degree of the plurality of high-frequency binary fringe patterns is calculated by the following formula:

$$B(T)' = \frac{2a_2 E}{\pi} d(T);$$

wherein T represents a fringe width of a pattern; B(T)' represents a modulation degree of a high-frequency binary fringe pattern; $a_2$ represents a response level of a harmonic signal; and d(T) represents a modulation attenuation coefficient of a high-frequency binary fringe pattern; and the defocusing degree is calculated by the following formula:

$$\begin{bmatrix} 1 & -\frac{2\pi^2}{T_1^2} \\ \vdots & \vdots \\ 1 & -\frac{2\pi^2}{T_m^2} \\ \vdots & \vdots \\ 1 & -\frac{2\pi^2}{T_M^2} \end{bmatrix} \times \begin{bmatrix} \ln\left(\frac{2a_2 E}{\pi}\right) \\ \sigma_d^2 \end{bmatrix} = \ln \begin{bmatrix} B(T_1)' \\ \vdots \\ B(T_m)' \\ \vdots \\ B(T_M)' \end{bmatrix};$$

wherein $T_1$, $T_m$, and $T_M$ respectively represent a fringe width of a first high-frequency binary fringe pattern, an $m^{th}$ high-frequency binary fringe pattern, and an $M^{th}$ high-frequency binary fringe pattern in the to-be-projected pattern set; M represents the number of the plurality of high-frequency binary fringes patterns in the to-be-projected pattern set; $B(T_1)'$, $B(T_m)'$, and $B(T_M)'$ respectively represent a modulation degree of the first high-frequency binary fringe pattern, the $m^{th}$ high-frequency binary fringe pattern, and the $M^{th}$ high-frequency binary fringe pattern;

and $\sigma_d$ represents the defocusing degree.

7. The large-depth-range 3D measurement method of claim 6, wherein the phase errors of a corresponding high-frequency sinusoidal fringe under different fringe widths are estimated by:

$$\sigma_\phi(T_m) = \frac{T_m}{2\pi}\sqrt{\frac{\pi^2 \sigma_n^2}{2d^2 E^2 a_2^2 N} + \frac{1}{2}\left\{\frac{d_{T_m}^{([N,2]-1)^2-1}}{[N,2]-1} + \frac{d_{T_m}^{([N,2]+1)^2-1}}{[N,2]+1}\right\}};$$

wherein $\sigma_\phi(T_m)$ represents an estimated phase error of a sinusoidal fringe under a fringe width of $T_m$; N represents the number of projected patterns; $\sigma_n$ represents a variance of random noise; [N,2] represents a least common multiple of N and 2; and $d_{T_m}$ represents a modulation attenuation coefficient of a high-frequency binary fringe pattern with a fringe width of $T_m$.

8. The large-depth-range 3D measurement method of claim 7, wherein an absolute phase corresponding to a minimum phase error in the absolute phases of the high-frequency sinusoidal fringes is selected as the optimal absolute phase.

* * * * *